United States Patent [19]

Meltz et al.

[11] Patent Number: 5,061,032
[45] Date of Patent: Oct. 29, 1991

[54] OPTICAL WAVEGUIDE EMBEDDED LIGHT REDIRECTING AND FOCUSING BRAGG GRATING ARRANGEMENT

[75] Inventors: Gerald Meltz, Avon; William W. Morey, West Hartford; Arnold L. Wilson, Manchesster, all of Conn.

[73] Assignee: United Technologies Corporation, Hartford, Conn.

[21] Appl. No.: 456,442

[22] Filed: Dec. 26, 1989

[51] Int. Cl.$^5$ .............................................. G02B 6/34
[52] U.S. Cl. ........................................ 385/37; 385/33
[58] Field of Search .......................... 350/96.18, 96.19

[56] References Cited

U.S. PATENT DOCUMENTS

| | | | |
|---|---|---|---|
| 3,814,498 | 6/1974 | Tomlinson et al. | 350/96.19 |
| 4,687,286 | 8/1987 | Winful | 350/96.19 |
| 4,725,110 | 2/1988 | Glenn et al. | 350/96.19 |
| 4,737,007 | 4/1988 | Alferness et al. | 350/96.19 |
| 4,807,950 | 2/1989 | Glenn et al. | 350/96.19 |

*Primary Examiner*—William L. Sikes
*Assistant Examiner*—Robert E. Wise
*Attorney, Agent, or Firm*—Peter R. Ruzek

[57] ABSTRACT

An optical waveguide light redirecting arrangement includes an optical waveguide having a solid portion that guides light in a first path along a longitudinal axis, with at least one grating region being embedded in the solid portion at a location remote from its end portions. The grating region includes a multitude of grating elements extending at such longitudinal spacings and at such oblique angles relative to the longitudinal axis to redirect light reaching the grating elements between the first path and at least one second path extending externally of the waveguide and diverging between a focus situated at a predetermined distance from the waveguide and the grating region. When light is directed in one of the first and second paths toward the grating region, it is redirected by the grating elements into the respectively other of the second and first paths with attendant in-phase combination in the other path of light having a wavelength within a range around a central wavelength. The grating elements are formed in the waveguide by exposing the waveguide to an interference pattern of two ultraviolet radiation beams that are symmetrical with respect to a plane extending at the oblique angle relative to the waveguide axis at the center of the grating region.

4 Claims, 2 Drawing Sheets 5,061,032

OPTICAL WAVEGUIDE EMBEDDED LIGHT REDIRECTING AND FOCUSING BRAGG GRATING ARRANGEMENT

DESCRIPTION

1. Technical Field

The present invention relates to optical waveguides in general, and more particularly to optical waveguides, especially fibers, that are provided with embedded light redirecting Bragg gratings, to optical systems utilizing such optical waveguides, and to methods of producing such optical waveguides.

2. Background Art

There are already known various constructions of optical waveguides, including optical fibers, that are provided with embedded gratings that are being used either for inserting light into or for removing light from the respective optical waveguide at an intermediate location or at different intermediate locations of the waveguide. So, for instance, the U.S. Pat. No. 4,749,248 to Aberson, Jr. et al, issued on June 7, 1988, discloses a device for tapping radiation from, or injecting radiation into, a single mode optical fiber. This patent discloses that it is possible to convert a guided mode in an optical fiber into a tunnelling leaky mode or vice versa by forming a grating of appropriate periodicity at least in the core of the optical fiber, and either to remove the guided mode from the fiber core into the cladding by converting it into the leaky mode, and ultimately from the fiber altogether, or to insert light of an appropriate wavelength into the core to form a guided mode therein by directing light of a proper wavelength from the exterior of the fiber toward the grating to propagate in the fiber cladding and to be converted by the grating into the guided mode in the fiber core. It is disclosed in this patent that the grating may be formed mechanically or by exploiting the photoelastic or photorefractive effect; in either case, the grating is formed in such a manner that fiber core regions of identical optical properties are situated in planes oriented normal to the longitudinal axis of the optical fiber.

While this approach may achieve satisfactory results for some applications, it has an important disadvantage in that it results in very high losses of optical power coupled out of or into the optical fiber. This is at least partially attributable to the fact that, inasmuch as the grating is imposed normal to the longitudinal axis of the core, the conversion of the guided mode into the leaky mode or vice versa takes place with uniform distribution all around the fiber axis, so that a predominant proportion of the leaky mode is not captured by the sensing arrangement when this approach is being used to tap light out of the fiber, or bypasses the fiber core when this approach is being used to launch light into the core via the cladding mode and its conversion into the guided core mode at the grating.

It is also already known, for instance from the commonly owned U.S. Pat. No. 4,725,110, issued on Feb. 16, 1988, to impress periodic gratings into the optical fiber core by exposing the core through the cladding to the interference pattern of two coherent ultraviolet light beams that are directed against the optical fiber at two angles relative to the fiber axis that complement each other to 180°. This results in a situation where the grating is oriented normal to the fiber axis so that it reflects, of the light launched into the fiber core for guided propagation therein in a propagation direction, only that having a wavelength within a very narrow range, back along the fiber axis opposite to the original propagation direction so that such reflected light is guided in the core to the point at which the original light had been launched into the fiber core. On the other hand, this grating is transparent to light at wavelengths outside the aforementioned narrow band so that it does not affect the further propagation of such other light. It may be seen that this approach has its limitations as well in that it is not suited for removing meaningful amounts of light from or launching them into the fiber at any other location than the respective fiber ends.

This problem has been addressed in a commonly owned copending U.S. patent application Ser. No. (07/426,450). The solution presented there involves writing the grating elements at an oblique angle relative to the longitudinal axis of the waveguiding region, such as of a fiber core, so that the thus formed grating redirects light between a first path extending longitudinally of the waveguiding region, and at least one second path extending between the grating and the exterior of the waveguide in a direction that depends on the axial wavenumber or wavelength of the light being so redirected. This second path is shown to have a dimension as considered in the longitudinal direction of the waveguide that substantially corresponds to the associated dimension of the grating, and an external lens is being used in the second path to either focus the light emanating from the fiber or to collimate light issued by an external source onto the grating, depending on whether the grating is being used to tap light out of the waveguide or launch light into the waveguide. It will be realized that the need for providing such a lens, which typically has a complex configuration and thus is quite expensive, significantly increases the cost of the equipment and thus detracts from the commercial appeal of such equipment. Moreover, alignment problems may be encountered either during the initial set-up or during the operation of the equipment.

Accordingly, it is a general object of the present invention to avoid the disadvantages of the prior art.

More particularly, it is an object of the present invention to provide an optical waveguide with an embedded light redirecting arrangement which does not possess the disadvantages of the known arrangements of this kind.

Still another object of the present invention is to develop the light redirecting arrangements of the type here under consideration in such a manner as to obtain highly efficient coupling of light at a selected wavelength within a limited range between the optical waveguide core and a spatially limited path extending externally of the core and passing through a focus or focal region.

It is yet another object of the present invention to devise an optical system utilizing the embedded grating optical waveguide of the above type, which system is instrumental in providing for the efficient coupling of light into and out of the optical waveguide and focusing of such light.

Yet another object of the present invention is to design the system of the above type in such a manner as to be very simple in construction, inexpensive to manufacture, easy to use, and yet reliable in operation.

A concomitant object of the present invention is to develop a method of forming the embedded tap in the optical waveguide core, which method is highly efficient and reliable.

DISCLOSURE OF THE INVENTION

In keeping with these objects and others which will become apparent hereafter, one feature of the present invention is embodied in an optical waveguide light redirecting arrangement which includes an optical waveguide having two spaced end portions, and including at least a waveguiding portion of a solid material capable of guiding light between the end portion in a first path extending along a predetermined axis. According to the invention, at least one grating region is embedded in the waveguiding portion at a location remote from the end portions, and has a multitude of grating elements extending at such spacings relative to one another as considered in the direction of the axis and at such oblique angles relative to the axis to redirect light reaching the grating elements between the first path and at least one second path extending externally of the waveguide and diverging between a focus and the grating region. There is further provided first optical means for directing light into one of the first and second paths and toward the grating region for redirection by the grating elements into the respectively other of the second and first paths with attendant in-phase combination in the other path of light having a wavelength within a range around a central wavelength, and second optical means for capturing the light propagating in the other path.

Another aspect of the present invention is a method of producing the grating region, which involves the exposure of the waveguiding portion to the interference pattern of two coherent ultraviolet radiation beams, where the angles of these beams with respect to the longitudinal axis of the waveguiding portion at the center of the grating region are selected in such a manner that the interference pattern fringes (e.g. intensity peaks) extend through the waveguiding portion at the aforementioned oblique angle and induce permanent variations in the refractive index of the waveguiding portion in dependence on the intensity of the fringes, thus forming the aforementioned grating elements. One of the interfering beams may have a curved phase front, or the grating region may be bent either during the formation of the grating, or during its use, to cause the grating elements to have the aforementioned focusing effect. Another series of refractive index variations may be imposed orthogonally to the first one for the grating to focus to a focal point. The present invention is also directed to a novel article of manufacture, that is, to an optical waveguide, especially an optical fiber, which is provided with at least one of the above-discussed redirecting grating regions that is produced by resorting to the above-discussed method of the present invention.

BRIEF DESCRIPTION OF THE DRAWING

The present invention will be described in more detail below with reference to the accompanying drawing in which.

BEST MODE FOR CARRYING OUT THE INVENTION

Figure 1:
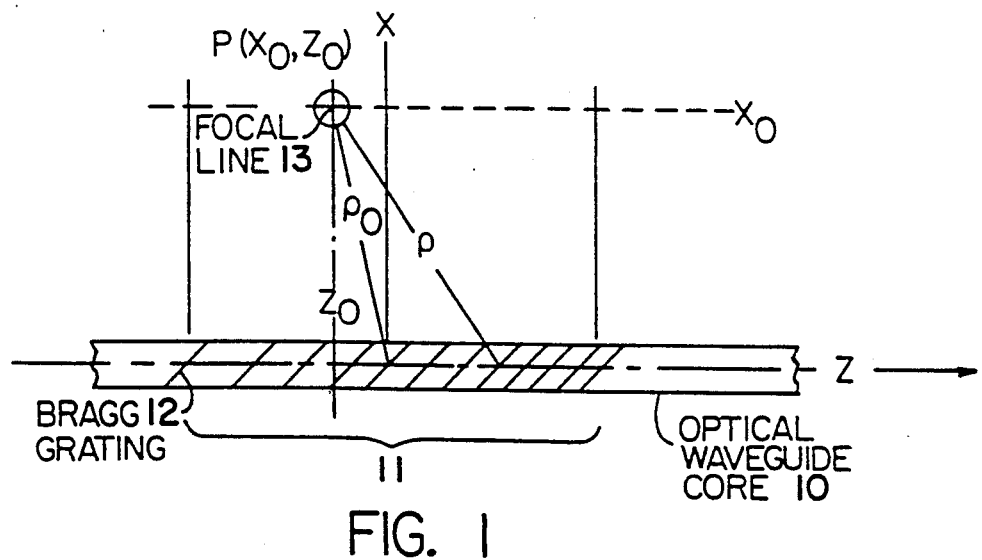
FIG. 1 is a considerably enlarged axial sectional view of an optical fiber provided with an embedded grating region in accordance with the present invention for use in redirecting light into or out of the fiber core with passage of such light through a focus external of the fiber.

Referring now to the drawing in detail, and first to FIG. 1 thereof, it may be seen that the reference numeral 10 has been used therein to identify an optical waveguide. The optical waveguide 10 is shown to be configured as an optical fiber core, of which only a relatively short longitudinal portion is depicted. If so desired, a non-illustrated fiber cladding could be arranged, as is well known in the optical fiber field, around the fiber core 10. The fiber core 10 incorporates a grating region 11 that includes a multitude of grating elements 12.

At this juncture, it may be appropriate briefly to describe the arrangement disclosed in the aforementioned U.S. patent application Ser. No. (07/426,450), as much of which as needed to fully appreciate and/or understand the present invention is incorporated herein by reference, so as to aid in understanding the problem with which the present invention successfully deals. In that arrangement, each of the grating elements extends at substantially the same oblique angle $\alpha$ with respect to the longitudinal axis of the core, and the grating elements are spaced the same distance from one another as considered in the longitudinal direction of the optical fiber. The grating elements are formed in the grating region of the core, which is preferably of a germanium-doped silica or similar glass that is capable of having the grating elements written, impressed or otherwise applied or embedded therein, by application of an interference pattern of two ultraviolet radiation beams to the core. The thus produced periodic grating elements then constitute refractive index perturbations that are permanently induced in the core by exposure to ultraviolet radiation. This method makes use of a first order absorption process in response to transverse irradiation of the fiber 10 with light in the ultraviolet absorption band of the core material. Inasmuch as the grating is formed by illuminating the core from the side, preferably through the cladding and without affecting the latter, with two coherent beams that are incident on the optical fiber symmetrically to a plane extending at the oblique angle $\alpha$ with respect to the longitudinal axis of the core, the intensity peaks of an interference pattern resulting from interference of the coherent incident beams, and thus the grating elements, extend parallel to this plane and the spacings between the grating elements are the same. Such exposure induces permanent refractive index changes in the grating region, in effect creating a phase grating effective for redirecting light reaching the grating.

While only a quite small portion of the light propagating through the fiber core or being launched into the core is redirected at each of the grating elements as a result of the refractive index changes attributable to the presence of the grating elements, subsequently to either leave the optical fiber or to be launched into the core for guided longitudinal propagation therein, respectively, the cumulative effect of the grating elements is the redirection of a significant proportion of the light the wavelength of which is in a very narrow range around the center wavelength λ that is in a predetermined ratio to the periodicity of the grating elements. Furthermore, the light within the narrow range that is thus redirected at any one of the grating elements out of the optical fiber is in such a phase relationship with respect to the light redirected at any other of the grating elements that the cumulative redirected light beam has a substantially planar wavefront so that substantially none of the thus escaping redirected light is lost to destructive interference or diffraction. Moreover, the thus escaping redirected light beam propagates outside the optical fiber along a single direction determined by the aforementioned oblique angle α, albeit with some fanning out in the circumferential direction, rather than all around the optical fiber; this facilitates the capture of the thus escaping light and increases the proportion of such light that is actually captured.

By the same token, when coherent light is being launched into the optical fiber core, it is sufficient to direct all of the power of such light all over the grating region along a single direction substantially coincident with the aforementioned path and including the requisite angle α with the longitudinal axis of the core, rather than having to distribute such power all around the optical fiber and, to the extent that such power is carried by light having a wavelength within the aforementioned narrow range around the center wavelength λ, a meaningful proportion of such directed light power will be redirected into the core for guided longitudinal propagation therein even though only a small portion of such light is redirected at each of the grating elements. This effect is attributable to the constructive interference between the partial light amounts which have been redirected at the respective grating elements with the partial light amounts redirected at the longitudinally consecutive ones of the grating elements. The constructive interference is not limited to a single value of the central wavelength λ; however, the angle of the external path that results in the constructive interference is peculiar to the respective central wavelength λ.

The arrangement described in the above patent application, as advantageous as it may be for some uses, has a considerable disadvantage that, inasmuch as the grating region occupies a finite and yet relatively significant length of the core and the partial light amounts redirected by the grating elements into the external path propagate substantially parallel to one another, the dimension of the external path that is parallel to the longitudinal core axis is substantially identical to the axial length of the grating region. To achieve efficient capture of the light emitted into the second path, the above patent application proposes the use of an external lens or of functionally similar external optical elements to concentrate or focus such partial light amounts onto a photodetector or another light receiver component. Conversely, light issued by an external source must be collimated prior to reaching the grating region and expanded to cover the entire grating region to efficiently launch light into the core, by external optics akin or identical to those described above. This complicates the structure of the arrangement, substantially increases its cost, and may result in alignment problems.

Turning now once more to FIG. 1 of the drawing, it is to be mentioned first that the concepts shown therein (as well as in the remaining Figures of the drawing) are based on the principles described above. Here again, the grating elements 12 are inscribed in the core 10 by exposing the grating region of the latter to an interference pattern of two incident ultraviolet light beams; however, unlike in the situation described above, the grating 11 has additional quadratic refractive index variations impressed therein.

A direct way of inscribing the grating 11 of the type revealed in FIG. 1 of the drawing in accordance with the present invention is by exposing the waveguide or core 10 to incident ultraviolet radiation beams at least one of which has a suitable phase front curvature, for instance, as a result of passage of the affected incident beam through an appropriately configured lens. In this context, it is to be mentioned that the in-fiber Bragg grating 11 can be thought of, and modeled as, a linear-phased array. Refractive index variations redirect a small fraction of an incident bound mode into a radiation pattern that is determined by the grating element period, tilt, and grating region length, the light wavelength, the waveguide cross section and the mode spectrum. If the grating period Λ is a constant, as it is in the arrangement of the above-discussed patent application, then the emission pattern is a narrow, conical diverging fan-shaped intensity distribution. In accordance with the present invention, this pattern is focused to a focal line in the near field by varying the grating period or wavenumber $K=2\pi/\Lambda$. As indicated in FIG. 1 of the drawing, a grating 11 having a linearly varying grating wavenumber or quadratic phase focuses the narrow diverging fan to a line focus at a point $P(x_o, z_o)$ in the longitudinal plane of the waveguide 10, thus creating the effect of a Fresnel lens. It is known, for instance, from the book by A. W. Snyder and J. D. Love entitled "Optical Waveguide Theory", Chapter 22, pp. 460–463, published by Chapman & Hall (1983), that weak index perturbations in a fiber core act as a distribution of point current dipoles, with phase and amplitude prescribed by the bound mode form and the grating period (or wavenumber) and strength. In the Fresnel zone, near to the fiber, the diffraction field $G(x_o, z_o)$ in the longitudinal plane can be expressed in terms of a Fresnel transform:

$$G(x_o, z_o) \approx \int_{-L/2}^{L/2} e^{j(K-\beta)x} \cdot e^{jknx^2/2z_o} \cdot e^{-jkn(xx_o/z_o)} dx$$

wherein n denotes the refractive index of the cladding, L is the length of the grating, k is the free space wavenumber, and β is the propagation constant of the bound mode.

If we let $K=K_o+knx/2z_o$, then $$\begin{aligned}G(x_o, z_o) &\approx \int_{-L/2}^{L/2} e^{j(K_o-\beta)-knx_o/z_o]x} dx \\ &= \text{sinc}\{[(K_o - \beta) - knx_o/z_o]L\} \\ &\approx \delta\{[(K_o - \beta) - knx_o/z_o]L\}.\end{aligned}$$

It may be seen from the above that the light is brought to a line focus at $P(x_o, z_o)$ where the angle $\arctan(x_o/z_o)$ is determined by the values of $K_o$ and $k_n$, as is the case in unfocused grating tap, and the position $z_o$ is determined by the sweep rate of K. Given the reciprocal effect of the grating 11, if light of the proper wavelength issued by an external source is caused to pass through and focus onto the focal line $P(x_o, z_o)$ on its way to the grating 11, the latter will redirect or launch such light into the waveguide 10 for longitudinal propagation therein.

Figure 2:
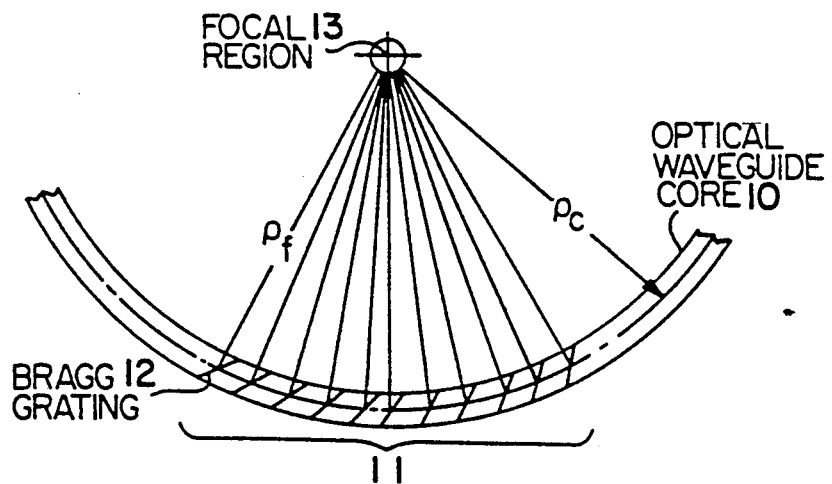
FIG. 2 is a view similar to that of FIG. 1 but showing the optical fiber as extending in a curved course during the formation or use of the grating region.

Similar focusing effect of the grating 11 is achieved if at least the grating region of the optical fiber or waveguide 10 is bent along a circular arc or any other suitable concave curve, either while the grating 11 is being written by exposure to the incident ultraviolet radiation beams symmetrical with respect to the plane extending at the angle α relative to a tangent to the longitudinal axis of the waveguide 10 at the center of the grating 11, or during the use of the waveguide after the grating 11 has been inscribed with the waveguide 10 extending along a straight course, as indicated in FIG. 2 of the drawing. Here, the phase variation is introduced by bending the waveguide 10 into a circular arc having a radius of curvature $\rho_c$.

When the grating period and tilt are set to redirect the light perpendicularly of the waveguide axis, the bending of the fiber focuses the pattern along a line at $\rho_f = \rho_c$.

Figure 3:
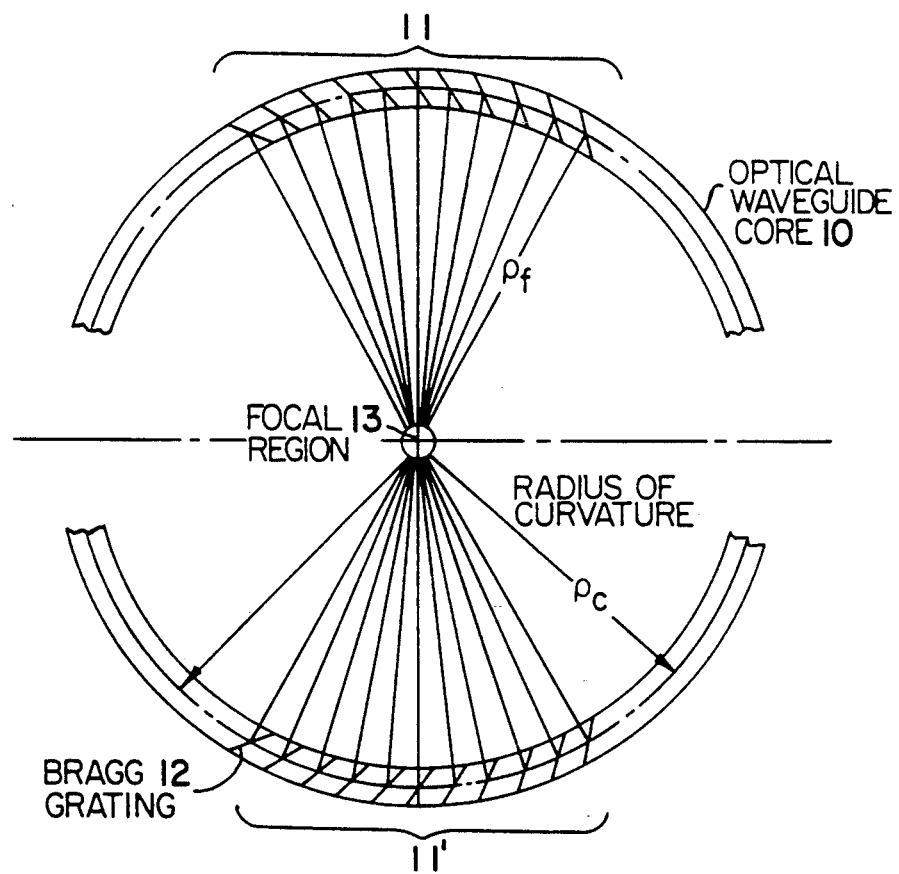
FIG. 3 is a view similar to that of FIG. 2 but showing an arrangement employing two of the fibers of FIG. 2 arranged oppositely to one another and one issuing light into and the other receiving light from a focal region thereof.

FIG. 3 of the drawing illustrates an optical arrangement that utilizes two waveguides 10 and 10' of the type described above, that is, each provided with the varying phase grating 11 or 11', one for illuminating an object 13 situated at and around the focal line $P(x_o, z_o)$ thereof, and the other for capturing light passing through (such as in measuring turbidity or the like) or radiated by (such as in measuring fluorescence) the object 13. The gratings 11 and 11' may both redirect light of the same wavelength, or each may redirect light of a different wavelength, depending on the parameter being measured. It will be seen that the amount of light received by the other of the waveguides 10 and 10' is an indication of the magnitude of the parameter being measured.

Figure 4:
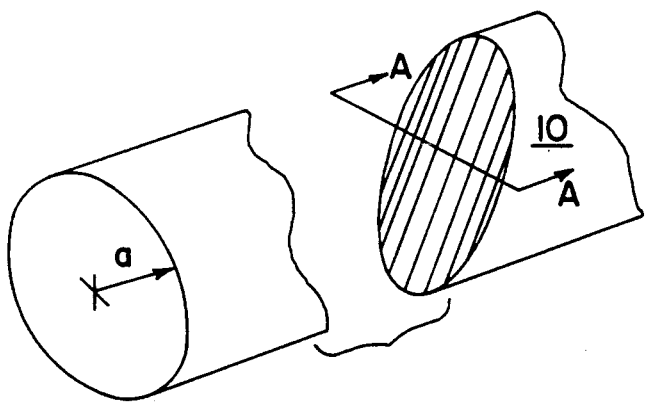
FIG. 4 is a considerably enlarged partially broken away perspective view of a waveguide provided with a grating formed by two orthogonal systems of refractive index variations to have a focal point for its focus.
Figure 5:
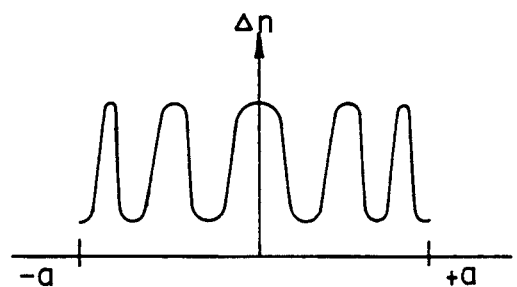
FIG. 5 is a graphic representation of the dependence of the change in the refractive index on distance from the center of the waveguide, taken on line A—A of FIG. 4.

The arrangements as described so far focus the emitted light escaping from the waveguide 10 to a focal line. However, as alluded to before, the thus escaping light forms a fan spreading in the circumferential direction of the waveguide 10 when the latter is constituted by an optical fiber. Under some circumstances, however, it may be desirable to focus such escaping light to a focal point rather than to a focal line. This can be accomplished, especially if the waveguide 10 is a multimode waveguide, in a manner depicted in FIG. 4 of the drawing, where it is indicated that at least partial Fresnel focusing can also be achieved in the plane orthogonal to the original Bragg plane by imposing a secondary quadratic phase variation into the waveguide 10 by exposure of the latter at the grating region 11 to another pair of interfering ultraviolet light beams. A graph of refractive index variation across the waveguide 10, taken on line A—A of FIG. 4, is presented in FIG. 5.

A particular advantage of the unidirectional focused redirection is not only the removal of at least a significant amount of the light of the selected narrow wavelength band around λ from the spectrum allowed to propagate through the waveguide 10 beyond the grating region 11 when the latter is being used for tapping light out of the fiber core 10, or insertion of such light into the core 10 when the grating region 11 serves to launch light into the fiber 10, but also, an possibly more importantly, an easy capture of the tapped-out redirected light in the narrow wavelength band around λ after its escape from the fiber 10 at the grating region location that may be situated a considerable distance from either one of the ends of the fiber 10, or easy insertion of such light into the fiber core 10 at such remote location, without the use of any external lenses or similar external focusing arrangements. Thus, the grating region 11 including the inclined grating elements 12 of the present invention constitutes a wavelength selective tap in the optical fiber 10 and also simultaneously focuses such light to a focus (either a focal line or a focal point) when used as a tap, or launches external light passing through such a focus on its way to the grating 11 into the waveguide 10 for longitudinal propagation therein.

While the present invention has been illustrated and described as embodied in a particular construction of an optical waveguide and associated equipment, it will be appreciated that the present invention is not limited to this particular example; rather, the scope of protection of the present invention is to be determined solely from the attached claims.

We claim:

1. An optical waveguide light redirecting and focusing arrangement comprising:

an optical waveguide having two spaced end portions, and including at least a waveguiding portion of a solid material capable of guiding light between said end portions in a first path extending along a predetermined axis, said waveguiding portion having a substantially constant cross section;

at least one grating region embedded in said waveguide portion at a location remote from said end portions and having a multitude of grating elements constituted by axially successive refractive index variations in said solid material and extending at such respective spacings as considered in the direction of said axis and at such respective oblique angle relative to said axis as to redirect light reaching said grating elements between said first path and at least one second path extending externally of said waveguide and diverging between a focus situated at a predetermined distance from said optical waveguide and said grating region;

first optical means for directing light into one of said first and second paths and toward said grating region for redirection by said grating elements into the respectively other of said second and first paths; and second optional means for capturing the light propagating in said other path.

2. An embedded light redirecting and focusing grating optical waveguide comprising:

an optical waveguide having two spaced end portions, and including at least a waveguiding portion of a solid material capable of guiding light between said end portions in a first path extending along a predetermined axis, said waveguiding portion having a substantially constant cross section;

at least one grating region embedded in said waveguide portion at a location remote from said end portions and having a multitude of grating elements constituted by axially successive refractive index variations in said solid material and extending at such respective spacings as considered in the direction of said axis and at such respective oblique angle relative to said axis as to redirect light reaching said grating elements between said first path and at least one second path extending externally of said waveguide and diverging between a focus situated at a predetermined distance from said optical waveguide and said grating region.

3. A method of forming an embedded optical light redirecting and focusing grating in a selected grating region of an elongated solid portion of an optical waveguide, comprising the steps of:

forming two mutually coherent beams of ultraviolet radiation at least one of which has a curved phase front; and directing the two beams transversely on the solid portion at respective angles of incidence selected for the beams to be symmetrical relative to a plane extending at an oblique angle relative to a longitudinal axis of the solid portion for the two beams to coherently interfere with one another with attendant generation of an interference pattern having intensity peaks that extend into and through said grating region and form therein a multitude of permanently embedded grating elements that are so oriented and spaced from one another as to redirect light reaching them between a first path extending longitudinally through the solid portion and at least one second path extending externally of the waveguide and diverging between a focus situated at a predetermined distance from said waveguide and said grating region.

4. A method of forming an embedded optical light redirecting and focusing grating in a selected grating region of an elongated solid portion of an optical waveguide, comprising the steps of:

forming two mutually coherent beams of ultraviolet radiation;

directing the two beams into a spatial region at such respective angles as to be symmetrical relative to a plane of symmetry with attendant formation of an interference pattern having intensity peaks extending parallel to said symmetry plane in said spatial region;

placing the grating region into said spatial region in such an orientation that said plane extends at a predetermined oblique angle with respect to an axis of the solid portion substantially centrally of the grating region for said interference pattern to extend into and through the solid portion with attendant formation of grating elements constituted by periodically repetitive refractive index variations in the grating region in dependence on intensity variations of said interference pattern;

positioning the grating region at a location of use; and causing said grating region to extend along a curved course during one, and a straight course during the other, of said placing and positioning steps for said grating elements to be so oriented and spaced from one another during the use thereof at said location of use as to redirect light reaching them between a first path extending longitudinally through the solid portion and at least one second path extending externally of the waveguide and diverging between a focus situated at a predetermined distance from said waveguide and said grating region.

* * * * *

UNITED STATES PATENT AND TRADEMARK OFFICE
CERTIFICATE OF CORRECTION

PATENT NO. : 5,061,032

DATED : October 29, 1991

INVENTOR(S) : Gerald Meltz, William W. Morey, Arnold Wilson

It is certified that error appears in the above-identified patent and that said Letters Patent is hereby corrected as shown below:

Column 8, Claim 1, Line 53 "optional" should be --optical--

Signed and Sealed this

Eighth Day of June, 1993

*Attest:*

MICHAEL K. KIRK

*Attesting Officer*    Acting Commissioner of Patents and Trademarks